US006496215B2

(12) United States Patent
Wilson

(10) Patent No.: US 6,496,215 B2
(45) Date of Patent: Dec. 17, 2002

(54) THERMAL SCAN LINE BOW ADJUSTMENT IN AN OPTICAL SCANNING SYSTEM

(75) Inventor: James M. Wilson, Glendora, CA (US)

(73) Assignee: Xerox Corporation, Stamford, CT (US)

( * ) Notice: Subject to any disclaimer, the term of this patent is extended or adjusted under 35 U.S.C. 154(b) by 19 days.

(21) Appl. No.: 09/739,558

(22) Filed: Dec. 15, 2000

(65) Prior Publication Data

US 2002/0075381 A1 Jun. 20, 2002

(51) Int. Cl.⁷ .................................................. B41J 27/00
(52) U.S. Cl. ........................................................ 347/256
(58) Field of Search ................................ 347/243, 259, 347/261

(56) References Cited

U.S. PATENT DOCUMENTS

| 5,543,829 A | 8/1996 | Fisli ............................ 347/241 |
| 6,266,174 B1 * | 7/2001 | Aoki ............................ 359/204 |
| 6,347,002 B1 * | 2/2002 | Hagelin et al. .............. 347/241 |

\* cited by examiner

*Primary Examiner*—Michael Nghiem
(74) *Attorney, Agent, or Firm*—William Propp

(57) ABSTRACT

A heating element adjusts the curvature of a cylindrical wobble correction mirror to compensate and correct the scan line bow for an optical scanner. A current applied through the heating element along one side of the mirror will cause the mirror to bend vertically for a horizontal beam to adjust the scan line bow for a single beam and approximately equalize the scan line bow for multiple beams.

6 Claims, 5 Drawing Sheets

THERMAL SCAN LINE BOW ADJUSTMENT IN AN OPTICAL SCANNING SYSTEM

BACKGROUND OF THE INVENTION

This invention relates to the scan line bow in an optical scanning system and, more particularly, to a heating element for adjusting the curvature of a cylindrical mirror, typically the wobble correction mirror, to compensate and correct the scan line bow in an optical scanner or to approximately equalize the scan line bows in a multiple beam optical scanning system.

A raster output scanner (or ROS) conventionally has a multi-faceted polygon mirror that is rotated about its central axis while an intensity-modulated beam is directed to the rotating polygon at a predetermined angle. The light beam is reflected by a facet and thereafter focussed to a "spot" on a photosensitive recording medium. The rotation of the polygon causes the spot to scan linearly across the photosensitive medium in a scan direction. Meanwhile, the photosensitive medium is advanced relatively more slowly than the rate of the scan in a slow scan direction which is orthogonal to the scan direction. In this way, the beam scans the photosensitive medium in a raster scanning pattern.

Specifically, reference is made to FIG. 1, wherein there is disclosed a conventional prior art raster scanning system 10. A laser diode light source 12 emits a modulated coherent light beam 14 which is collimated by a multi-element optical collimator 16. The resulting collimated beam 14 passes through a cross-scan cylindrical lens 18. The cylindrical lens 18 focuses the light beam 14 in the sagittal or cross scan plane onto a facet 20 of the rotating multi-faceted polygon mirror 22 while maintaining the collimation of the scan portion of the beam. The light beam 14 thus forms a line on the facet 20.

The light beam 14 is reflected from the facet 20 and the reflected light beam is still collimated in the scan plane and is now diverging in the cross-scan plane. The reflected beam 14 then passes through an f-theta scan lens 24 consisting of a negative plano-spherical lens 26, a positive plano-spherical lens 28 and a cross-scan cylindrical lens 30. This f-theta scan lens configuration converges the beam 14 in the scan axis.

After passing through the f-theta scan lens 24, the light beam 14 is then reflected off a cylindrical wobble correction mirror 32. The mirror 32 is positive and cylindrical in the cross-scan plane and flat in the scan plane. Thus, the wobble mirror converges the previously diverging cross-scan portion of the light beam 14 but allows the converging cross-scan portion of the light beam 14 focused by the f-theta lens 24 to pass through unaffected. The reflected beam 14 is focussed onto a scan line 34 on a photosensitive medium 36 such as a photoreceptor.

A raster scanner typically includes a number of lenses and mirrors to accommodate a specific design. Unavoidable imprecision in the shape and/or mounting of these optical elements will inevitably introduce certain anomalies in the quality of the scan line on the photoreceptor. Also, different errors can be introduced to the light beam by different optical elements of the raster scanner in which case the error is cumulative. One such anomaly is bow.

Bow is an undesirable character of a scan line when the light beam is offset in the cross-scan direction from the ideal horizontal straight line in the scan direction of the scan line on the recording medium. The scan line bow occurs because the magnification of the optical system of the ROS varies across the cross-scan direction as the beam propagates through the optical system.

An example of a bow is shown by scan line 50 in FIG. 2. Depending on the types of imprecision in the ROS, the two end points of the bowed scan line will bend in an opposite direction relative to the mid-point of the bowed scan line with the scan line deviating relative to a straight, bow free line 52. A bow 50 (FIG. 2) with the end points of the scan line situated downward is called a frown and a bow 54 (FIG. 3) with the end points of the scan line situated upward is called a smile.

The scan lines from multiple raster scanners are registered or positioned in parallel lines on the photosensitive medium. Another undesirable character with multi-beam scanners is called differential bow. Differential bow happens in multi-beam raster scanners in which the multiple light beams are nominally off-axis relative to each other and relative to the straight bow free scan line.

For example, referring to FIG. 4, if the bow scan line 56 of one light beam from one ROS happens to be a smile while the bow scan line 58 of the other beam from another ROS happens to be a frown, then the separation 60 between the two beams varies across the scan. This phenomenon is called a differential bow. Differential bow can have different shapes such as two scan lines 62 and 64 in FIG. 5 with the same shape bow but a different amount of bow on each scan line. It is desirable to have all the scan lines straight and parallel so that the beam separation across the scan line would be uniform and therefore, the differential bow would be eliminated.

One solution to the problem of differential bow in a multiple beam ROS is found in U.S. Pat. No. 5,543,829 to Fisli, commonly assigned as the present application and herein incorporated by reference. The Fisli patent applies physical pressure directly to the back and front surfaces of the wobble correction mirror to adjust the curvature of the mirror horizontally. The resulting curved mirror will compensate for scan line bow.

This prior art solution to scan line bow requires physically bending the wobble correction mirror and maintaining the wobble correction mirror in a bent position. The mechanics for the device to physically bend the wobble correction mirror add considerable weight, alignment difficulty and complexity to the ROS.

Differential bow arises from multiple beams from a single ROS. Scan line bow is a different problem. Scan line bow arises in both single and multiple beam ROS's and is the overall curvature of the scan line relative to the ideal of a straight scan line.

It is an object of the present invention to provide an apparatus for thermally adjusting the curvature of a cylindrical mirror to compensate and correct the scan line bow in a single beam optical scanning system.

It is another object of the present invention to provide an apparatus for thermally adjusting the curvature of a cylindrical mirror to approximately equalize the scan line bows in a multiple beam multiple optical scanning system.

SUMMARY OF THE INVENTION

According to the present invention, a heating element adjusts the curvature of a cylindrical wobble correction mirror to compensate and correct the scan line bow for an optical scanner. A current applied through the heating element along one side of the mirror will cause the mirror to bend vertically for a horizontal beam to adjust the scan line bow for a single beam and approximately equalize the scan line bow for multiple beams. A rheostat will vary the current to vary the applied heat to control the amount of bend in the mirror.

Other objects and attainments together with a fuller understanding of the invention will become apparent and appreciated by referring to the following description and claims taken in conjunction with the accompanying drawings.

DESCRIPTION OF THE INVENTION

Figure 1:
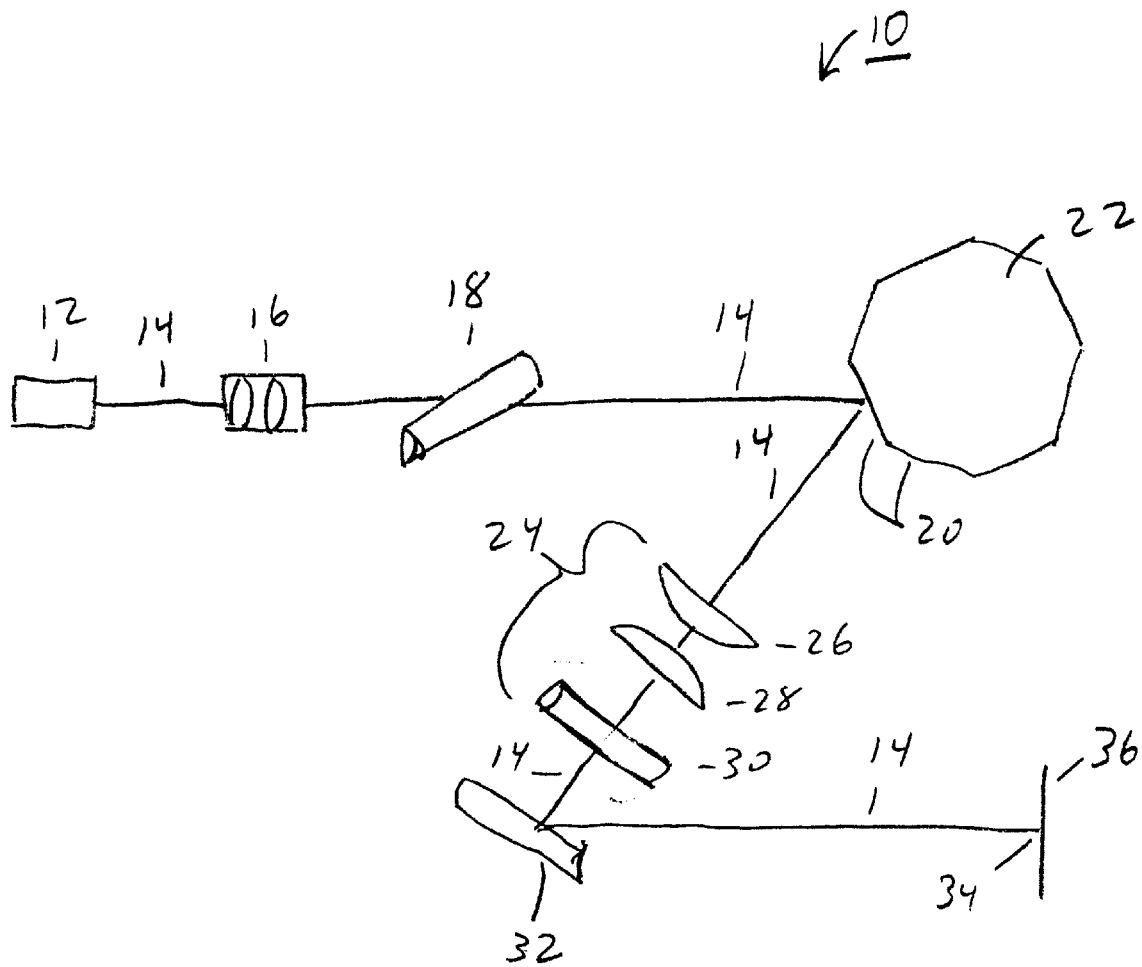
FIG. 1 illustrates a prior art raster scanning system.
Figure 2:
FIG. 2 illustrates a scan line bow frown.
Figure 3:
FIG. 3 illustrates a scan line bow smile.
Figure 4:
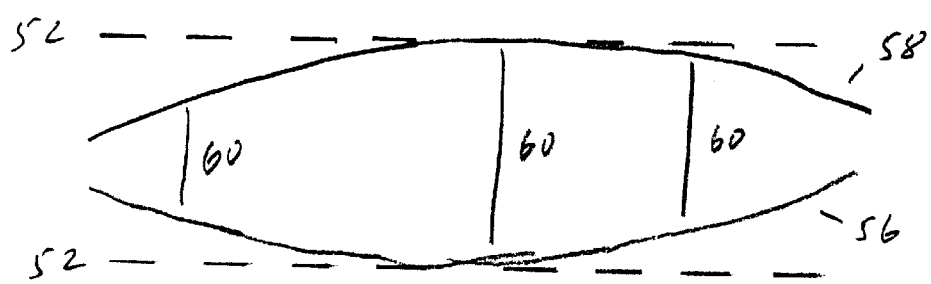
FIG. 4 illustrates a first form of differential bow.
Figure 5:
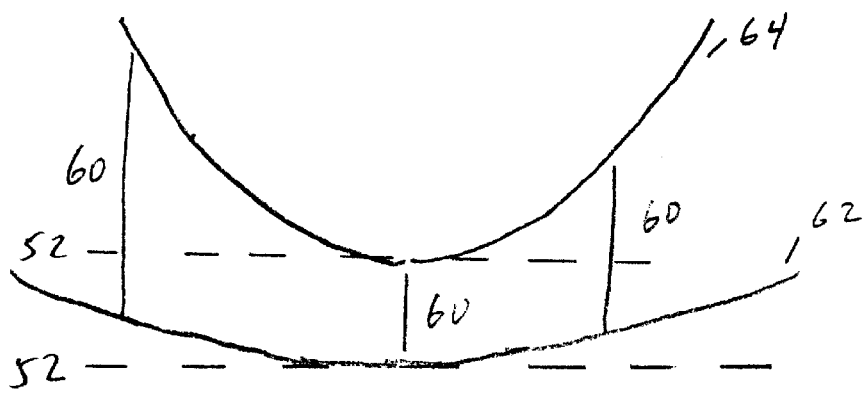
FIG. 5 illustrates a second form of differential bow.
Figure 6:
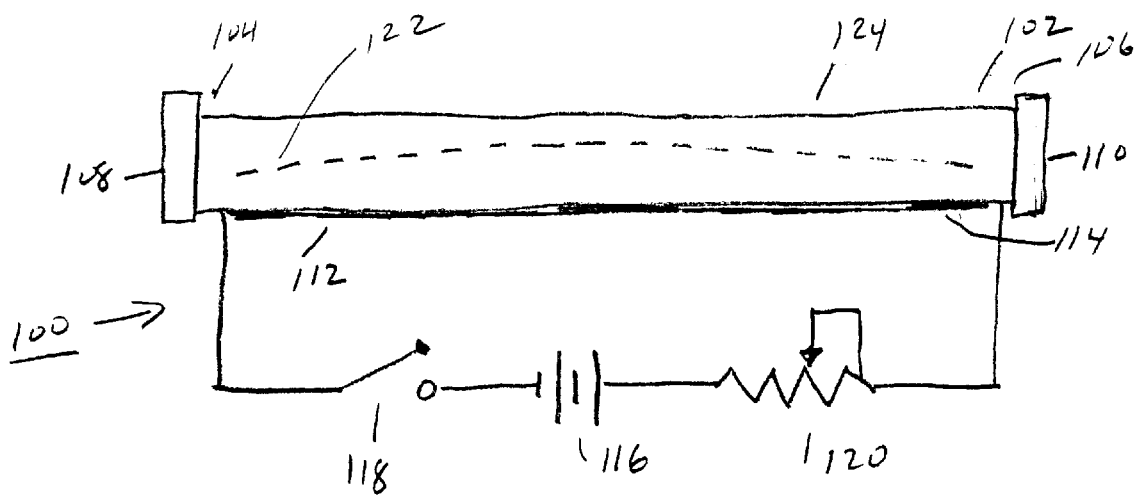
FIG. 6 illustrates a first embodiment of a wobble correction mirror with the heating element of the present invention.

Reference is now made to FIG. 6, wherein there is illustrated a first embodiment of a heating element 100 for adjusting the curvature of a cylindrical mirror 102 in accordance with this invention. The cylindrical mirror 102 is typically the wobble correction mirror in the ROS. The mirror is fabricated from plastic with a reflective dielectric coating. Alternately, the mirror could be fabricated from glass or metal. Also alternately, the mirror can have a reflective metallic coating.

The wobble correction mirror is the last optical element in the raster output scanning system before the light beam is focused to a spot on the scan line of the photosensitive medium. Since scan line bow arise from imperfections in the previous optical ROS elements and since the optical effects of the imperfections are cumulative, then the wobble correction mirror is the last, best opportunity to correct for bow of the ROS.

The mirror is flexibly secured at the horizontal ends 104, 106 by mirror mounts 108, 110. The mirror is secured at the horizontal ends to avoid twisting along the long horizontal axis of the mirror but the mirror is capable of bending along its vertical axis, the amount of the bending being adjusted by the heating element 100.

The heating element 100 has a thin, electrically conductive, nichrome wire 112 along the horizontal length of the mirror 102 along the bottom side 114 of the mirror 102. The wire 112 is connected to an electrical potential source 116 through a switch 118 and a rheostat 120.

As shown in FIG. 6, the heating element 100 is not on and the switch 118 is open. A light beam 122 is incident upon the surface of the mirror 102. The beam 122 has bow, a frown bow.

Figure 7:
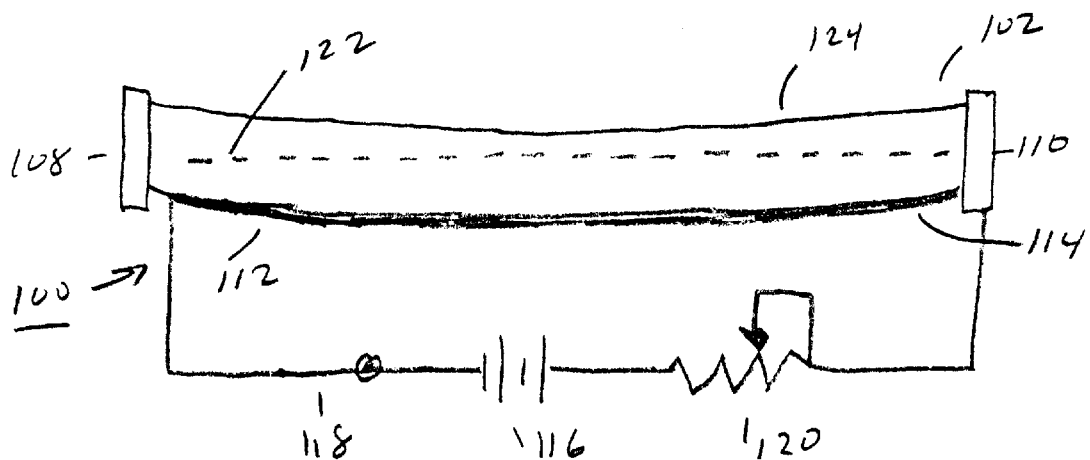
FIG. 7 illustrates the wobble correction mirror with the heating element of FIG. 6 in operation.

In FIG. 7, the switch 118 is closed, current from the electrical potential source 116 is variably adjusted by the rheostat 120 and flows through the wire 112 of the heating element 100. The heat generated by the wire 112 causing the mirror 102 to bend vertically towards the wire and towards the bottom surface 114 of the mirror. Both the bottom surface 114 and the top surface 124 of the mirror 102 will bend downward. The light beam 122 now is a straight bow-free line on the mirror 102. Bending the mirror by heat applied by the heating element corrects the bow in the scan line at the mirror.

Typical mirrors 102 are capable of being displaced vertically by up to 2 millimeters, depending on the width and the length of the mirror. However, movements of only a fraction of a millimeter are sufficient to correct for scan line bow problems.

The rheostat 120 allows for the current from the electrical potential source 116 to be variably adjusted to the wire 112 of the heating element. Varying the current to the wire varies the amount of heat produced by the wire applied at the surface of the mirror. And varying the amount of heat applied to the mirror varies the amount of vertical displacement of the mirror.

The heating element 100 of the mirror 102 preferably adjusts the curvature of the last mirror in the optical path of a light beam 122, i.e., the wobble correction mirror in a raster output scanning system, before the light beam impinges on a photoreceptor. However, the present invention can be used with any mirror in the optical system.

The heating element is preferably adjusted after determining the amount of scan line bow in an optical system. This can be done by first allowing a light beam to reflect from the mirror and scan onto a measuring system in place of the photoreceptor in the actual ROS system. The scan line bow can then be determined and measured, as is well-known in the art. The heating element is then appropriately adjusted using the above described method and apparatus to compensate and correct for the scan line bow. The light beam is then reflected from the mirror and scanned across the photoreceptor with the compensated scan line bow introduced into the mirror. Again, the scan line bow is determined and measured. If necessary, the heating element is again adjusted until the scan line bow is substantially eliminated.

This process can be repeated for each of the beams in a multiple beam raster output scanning system to correct for differential bow. Other methods of determining the scan line bow are also within the scope of this invention.

Thus, scan line bow can be corrected by introducing a compensating scan line bow within the mirror 102 of the raster output scanning system using the above-described apparatus and method.

By compensating for scan line bow for a single ROS by correcting to a straight scan line, the invention of the present application can approximately equalize scan line bow for multiple beams from multiple ROS's with each individual ROS producing a single beam.

Figure 8:
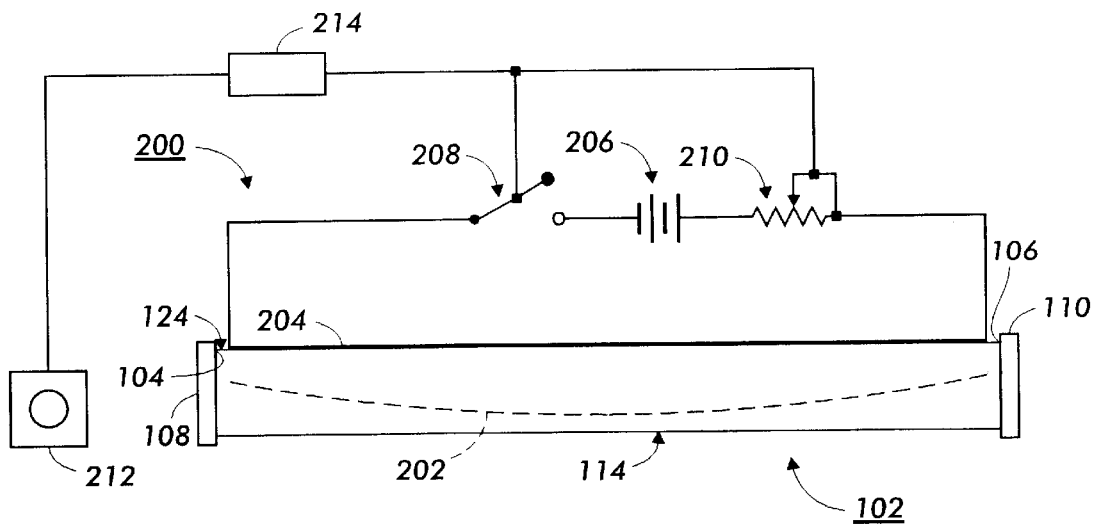
FIG. 8 illustrates a second embodiment of a wobble correction mirror with the heating element of the present invention.

Reference is now made to FIG. 8, wherein there is illustrated a second embodiment of a heating element 200 for adjusting the curvature of the cylindrical mirror 102 in accordance with this invention.

The scan line 202 has bow, a smile bow, on the cylindrical mirror 102. The heating element 200 has a thin, electrically conductive, nichrome wire 204 extending along the length of the mirror 102 along the upper surface 124 of the mirror. The wire 204 is connected to an electrical potential source 206 through a switch 208 and a rheostat 210. In FIG. 8, the heating element 200 is not on and the switch 208 is open.

Figure 9:
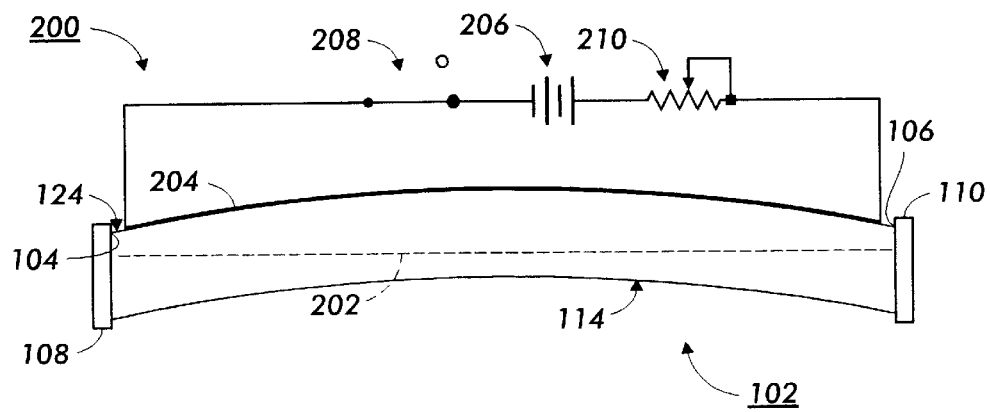
FIG. 9 illustrates the wobble correction mirror with the heating element of FIG. 8 in operation

In FIG. 9, the switch 208 is closed, current from the electrical potential source 206 is variably adjusted by the rheostat 210 and flows through the wire 204 of the heating element. The heat generated by the wire 204 causing the mirror 102 to bend vertically towards the wire and towards the upper surface 124 of the mirror. The mirror is flexibly secured at the horizontal ends 104, 106 by mirror mounts 108, 110. Both the bottom surface 114 and the top surface 124 of the mirror 102 will bend upward. The light beam 202 now is a straight bow-free line on the mirror 102.

Figure 10:
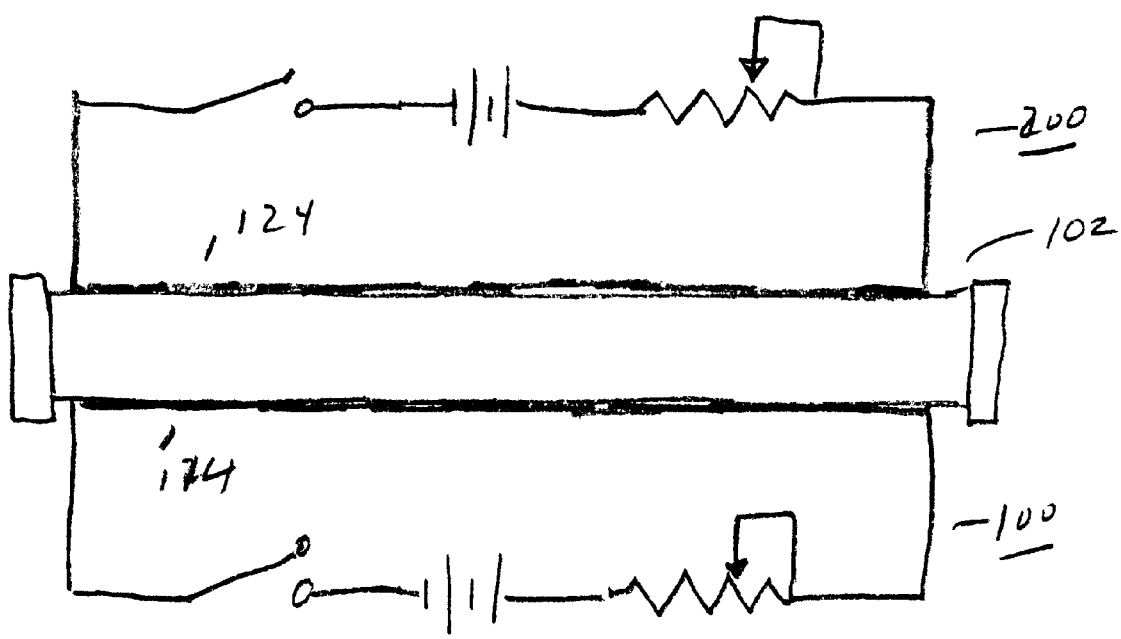
FIG. 10 illustrates a third embodiment of a wobble correction mirror with the heating element of the present invention.

Reference is now made to FIG. 10, wherein there is a third embodiment of the heating element 100 along the bottom surface 114 of the mirror 102 and the heating element 200 along the top surface 124 of the mirror 102. This embodiment of the invention can adjust the mirror for any kind of scan line bow.

The heating element of the present invention can be constantly adjusted to provide a dynamic solution to scan line bow. A scan line sensor 212 can monitor the bow of a scan line at either the cylindrical wobble correction mirror or at the photosensitive medium of the ROS. The sensor can be connected to a controller 214 which controls the switch and the rheostat of the heating element to provide constant adjustment to the heating element and to the scan line.

The heat producing wire of the heating element can alternatively be a thin or thick film resistor or a plurality of resistive heat-producing elements.

While the invention has been described in conjunction with specific embodiments, it is evident to those skilled in the art that many alternatives, modifications and variations will be apparent in light of the foregoing description. Accordingly, the invention is intended to embrace all such alternatives, modifications and variations as fall within the spirit and scope of the appended claims.

What is claimed is:

1. An apparatus for compensating for scan line bow in an optical scanning system comprising a wobble correction mirror for reflecting a light beam to a photosensitive medium of said optical scanning system, and a heating element extending along one side of said wobble correction mirror, wherein heat from said heating element adjustably controlling the curvature of said wobble correction mirror to compensate for the scan line bow of said light beam.

2. The apparatus for compensating for scan line bow in an optical scanning system of claim 1 wherein said heat causes said wobble correction mirror to bend towards said heating element.

3. The apparatus for compensating for scan line bow in an optical scanning system of claim 2 wherein said heater element includes a wire extending along one side of said wobble correction mirror, wherein heat from said wire adjustably controlling the curvature of said wobble correction mirror to compensate for the scan line bow of said light beam, said heater element further includes a rheostat and an electrical potential source connected to said wire to vary the current to said wire and vary the heat applied to said wobble correction mirror.

4. The apparatus for compensating for scan line bow in an optical scanning system of claim 3 further comprising a scan line sensor to monitor said scan line bow of said light beam and a controller to control a switch and the rheostat of the heating element to provide constant adjustment to the heating element and to the scan line bow.

5. The apparatus for compensating for scan line bow in an optical scanning system of claim 1 further comprising mirror mounts to secure the horizontal ends of said wobble correction mirror.

6. The apparatus for compensating for scan line bow in an optical scanning system of claim 1 wherein scan line bows of multiple beams from multiple optical scanning systems are adjusted to approximately straighten said scan line bows.

* * * * *